US006483599B1

(12) United States Patent
Woodman et al.

(10) Patent No.: US 6,483,599 B1
(45) Date of Patent: Nov. 19, 2002

(54) SYSTEM AND METHOD FOR SEPARATING A PRINT STREAM INTO AN ELECTRONIC DOCUMENT PRINT STREAM AND A PHYSICAL DOCUMENT PRINT STREAM (75) Inventors: Clare E. Woodman, Norwalk, CT (US); David P. Gardner, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/222,528

(22) Filed: Dec. 29, 1998

(51) Int. Cl.[7] .............................................. G06F 15/00
(52) U.S. Cl. ....................... 358/1.15; 358/1.1
(58) Field of Search ......................... 358/1.15, 1.13, 358/1.18, 1.6, 1.1, 407, 468; 705/14, 10, 26, 27; 382/101, 102

(56) References Cited

U.S. PATENT DOCUMENTS

| | | | |
|---|---|---|---|
| 4,908,850 A | 3/1990 | Masson ........................ 379/88 |
| 4,941,091 A | 7/1990 | Breault et al. ............... 364/406 |
| 5,142,662 A | 8/1992 | Gump et al. .................. 395/100 |
| 5,187,787 A | 2/1993 | Skeen ......................... 395/600 |
| 5,220,501 A | 6/1993 | Lawlor et al. ............... 364/408 |
| 5,280,531 A | 1/1994 | Hunter ........................ 364/464 |
| 5,283,829 A | 2/1994 | Anderson ....................... 380/9 |
| 5,381,527 A | 1/1995 | Inniss et al. ................. 395/200 |
| 5,383,113 A | 1/1995 | Kight et al. .................... 705/40 |
| 5,465,206 A | 11/1995 | Hilt et al. ...................... 705/40 |
| 5,479,411 A | 12/1995 | Klein ....................... 370/110.1 |
| 5,483,445 A | 1/1996 | Pickering ..................... 705/40 |
| 5,493,692 A | 2/1996 | Thelmer et al. ............ 455/26.1 |
| 5,496,991 A | 3/1996 | Delfer et al. ................ 235/379 |
| 5,508,817 A | 4/1996 | Kunigame ................... 358/402 |
| 5,509,071 A | 4/1996 | Petrie, Jr. et al. ............... 380/4 |
| 5,513,126 A | 4/1996 | Harkins et al. .......... 364/514 A |
| 5,579,087 A | * 11/1996 | Salgado ..................... 358/296 |
| 5,608,786 A | 3/1997 | Gordon et al. ............... 379/100 |
| 5,627,764 A | 5/1997 | Schutzman et al. ..... 364/514 R |
| 5,630,060 A | 5/1997 | Tang et al. ............. 395/200.01 |
| 5,657,461 A | 8/1997 | Harkins et al. ............. 395/333 |
| 5,675,507 A | 10/1997 | Bobo, II .................. 364/514 R |
| 5,684,965 A | 11/1997 | Pickering .................... 395/234 |
| 5,694,551 A | 12/1997 | Doyle et al. .................. 705/26 |
| 5,696,906 A | 12/1997 | Peters et al. .................. 705/34 |
| 5,699,528 A | 12/1997 | Hogan ......................... 705/40 |
| 5,761,650 A | 6/1998 | Munsil et al. ................. 705/34 |

(List continued on next page.)

OTHER PUBLICATIONS

"Methodology for Mail Delivery in a Multi–Media Environment", IBM Technical Disclosure Bulletin, Apr. 1993.

"The Future of Mail and Messaging", Brian Baxendale, President Pitney Bowes, Production Mail & Software Systems Division, Dec. 1996/Jan. 1997, Mail: The Journal of Communication Distribution.

Primary Examiner—Gabriel Garcia
(74) Attorney, Agent, or Firm—Michael J. Cummings; Angelo N. Chaclas (57) ABSTRACT An apparatus for separating print stream data containing a plurality of primary documents and information concerning associated customers to receive the documents, wherein the apparatus receives customer preference data that allow separation of the print stream data into an electronic primary document print stream and a hard copy primary document print stream. The print stream separator further generates a second output for the customers that are to receive their primary documents by electronic delivery, where this second output contains information regarding which of a plurality of secondary documents the customer should receive with the primary document. The priorities of these secondary documents may be based upon specific customer preference data for the specific customer receiving his or her primary document. Priorities for these secondary documents can also be included in this second output. A method corresponding to this apparatus is also described.

10 Claims, 4 Drawing Sheets

U.S. PATENT DOCUMENTS

| | | |
|---|---|---|
| 5,790,790 A | 8/1998 | Smith et al. ................. 395/200 |
| 5,794,221 A | 8/1998 | Egendorf ...................... 705/40 |
| 5,802,498 A | 9/1998 | Comesanas .................. 705/34 |
| 5,825,865 A | 10/1998 | Oberlander et al. ........ 379/211 |
| 5,832,460 A | 11/1998 | Bednar et al. ................. 705/27 |
| 5,872,926 A | 2/1999 | Levac et al. ........... 395/200.36 |
| 5,873,073 A | 2/1999 | Bresnan ..................... 705/410 |
| 5,884,284 A | 3/1999 | Peters et al. ................... 705/30 |
| 5,956,693 A * | 9/1999 | Geerlings .................... 705/14 |
| 5,963,925 A | 10/1999 | Kolling et al. ................ 705/40 |
| 6,031,625 A | 2/2000 | Sherman et al. ........... 358/1.18 |
| 6,044,362 A | 3/2000 | Neely ........................... 705/34 |
| 2001/0014164 A1 * | 8/2001 | Daniels et al. ............. 358/1.15 |
| 2001/0049659 A1 | 12/2001 | Eckl ........................... 705/40 |

* cited by examiner

SYSTEM AND METHOD FOR SEPARATING A PRINT STREAM INTO AN ELECTRONIC DOCUMENT PRINT STREAM AND A PHYSICAL DOCUMENT PRINT STREAM

BACKGROUND OF THE INVENTION

In the development of a digital data delivery system, it is found that an analog to the physical generation of a printed document is advantageous for acceptance of an electronic version of the document for presentation to an end-user such as a customer receiving for instance, a bill from a company with which that customer does business. In many legacy computer systems, mainframe computers are used to generate print stream information in one of a plurality of formats, including the AFP file format. It is thus desirable to be able to use such a file format as the basis for generating electronic document in a digital document delivery system.

SUMMARY OF THE INVENTION

A print stream separator according to the present invention receives print stream data from an associated generator of such information, such as a legacy mainframe computer print stream output. Such information in a typical application may contain a plurality of customer bills for presentation to the customers of a particular company. Bill information and accompanying customer account information form at least part of this print stream. Such information in the past would generally be directed to a high speed, high volume printer in a particular file format such as the AFP file format for generation of the customer bills with insertion of one or more hard copy inserts, typically of an advertisement or informational nature. Such inserts are put into the customer's bill based upon information concerning the identified customer as derived from a customer preference database and with the specific inserts being determined based upon a prioritization in view of information received from the customer preference database so as to maintain a certain weight limit for the hard copy mailing.

The present invention provides a print stream separator which receives the initial print stream data, as well as information from a customer preference database. The print stream separator then determines which documents are to be generated in electronic form and which are to be directed to a high speed, high volume printer, such that the data presented to the high speed, high volume is separate and distinct from the data sent for ultimate presentation and viewing in electronic form. Information within the customer preference file for each customer is the basis upon which a determination is made as to directing the print stream either to the high speed, high volume printer or to an electronic inserter for presentation in electronic form.

If the data is to be presented in electronic form, the print stream separator generates two outputs, a first output representing the customer primary document to be ultimately viewed by the customer, as well as an Electronic Mail Run Data File (EMRDF), which includes a header and fields containing information directed to that customer and the preference of inserts to be generated with the primary document for that customer. Both the electronic document print stream and the EMRDF document record for the customer are then presented to the electronic inserter, which in turn receives job setup data from an associated job setup application module, including information for links associated with particular inserts to be associated with the customer's primary document. The electronic inserter generates an output print stream in an AFP file format containing the primary document information. The EMRDF file is communicated to the router instruction processor (RIP) and contains information regarding specific links for "inserts" (secondary documents) which are to be associated with the primary document.

As more fully described in co-pending application Ser. No. 09/222,196 entitled System and Method for Presenting and Processing Documents on the Internet, filed on the same date herein, and assigned to the same assignee, the print data stream from the electronic inserter is presented to an interactive bill presentation server (IBPS), under the control of a bill processing server (BPS). The IBPS output is ultimately presented to a customer having access to a computer with an associated web browser so as to allow view of the primary document and the associated inserts. The customer can, after viewing the primary document (which typically would be in the nature of a bill), respond to the primary document (bill) such as to make payment thereof. This response information is processed by the overall digital document delivery system by means of the bill processor server which updates the customer's account database such as to indicate payment of a bill or the like.

DETAILED DESCRIPTION

As used throughout this description, the words "user" and "customer" are synonymous as are the words "bill" and "primary document" and the words "insert" and "secondary document". Definitions of acronyms are presented in Table 1.

Figure 1A:
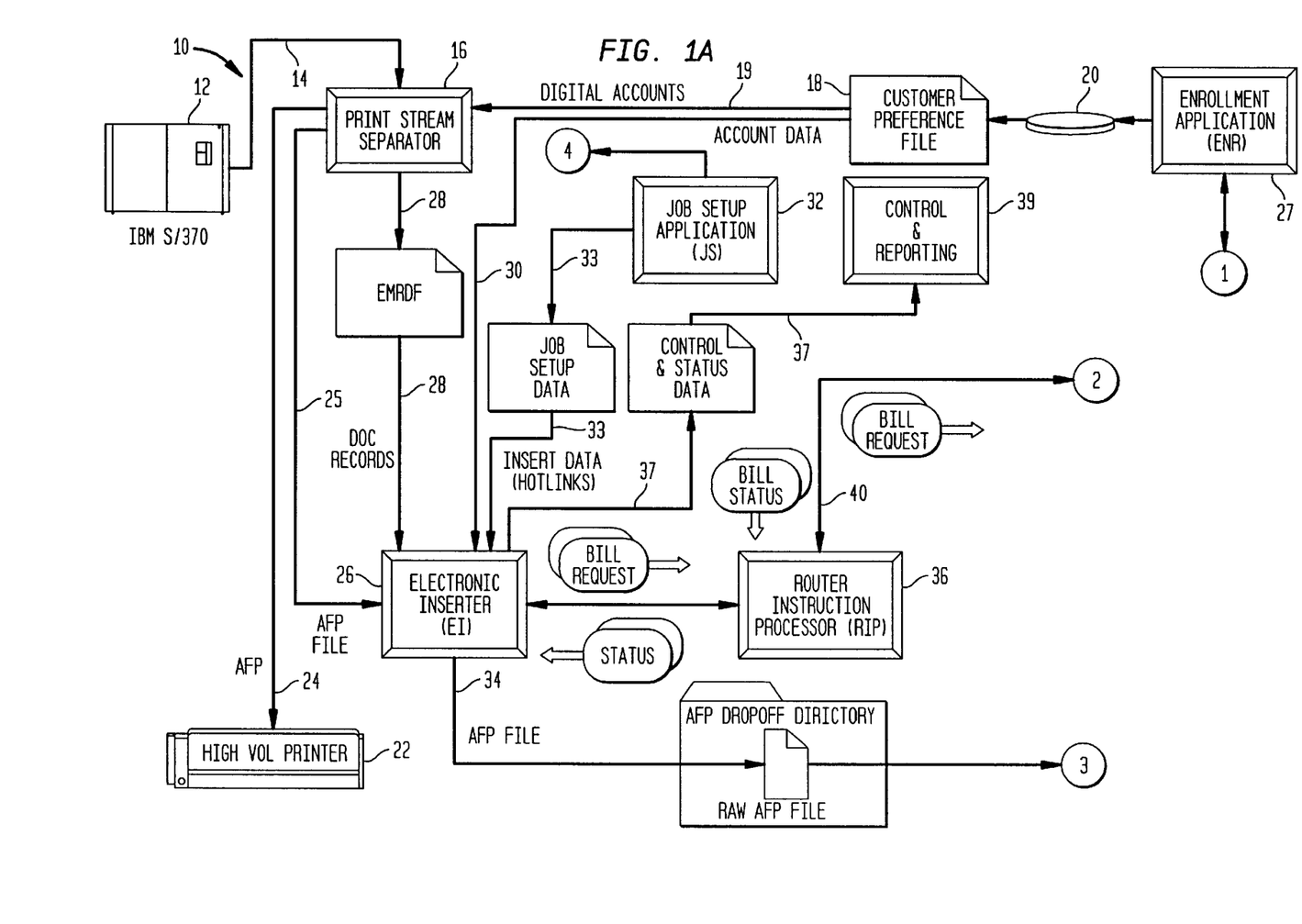
FIGS. 1A and 1B form an overall block diagram of a digital document delivery system according to the present invention illustrating the print stream separator and the associated electronic inserter forming part of the overall system and method.
Figure 1B:
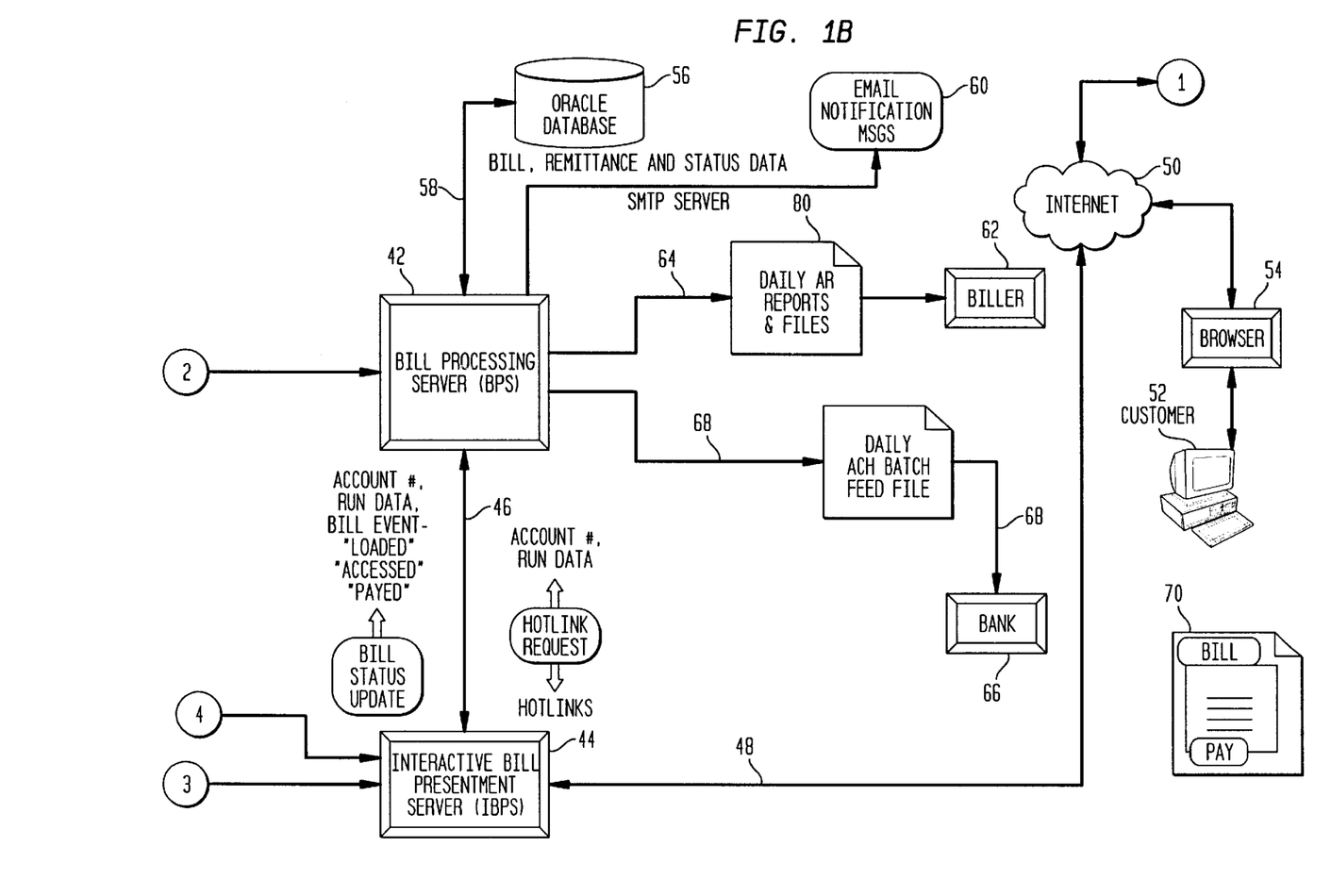

FIGS. 1A and 1B form an overall block diagrams of a digital document delivery system of which the print stream separator 16 and electronic insert 26 form a part thereof. Full disclosure concerning the overall operation of the digital document delivery system is presented in the aforementioned co-pending application Ser. No. 09/222,196 filed Dec. 29, 1998 entitled: System and Method for Presenting and Processing Documents on the Internet, assigned to the present assignee, and incorporated herein by reference.

The present invention is specifically directed to the mechanism by which a print stream generated by a computer system or the like such as a legacy mainframe computer 12 can be used as the input to a print stream separator so as to separate this print stream into a first print stream 24 intended for hard copy printing via a high speed, high volume printer 22 and a second print stream 25 intended for ultimate electronic delivery. The data emanating from the computer on output 14 typically represents a print stream of primary documents such as bills for customers of a public utility or the like. It is desired to be able to identify those documents which are intended for electronic distribution and to separate these documents from the print stream 14 so as to be deliverable in electronic form, while the remaining documents which are intended for hard copy printing are directed to the second print stream 24.

The print stream separator based upon customer information in the print stream 14 (which may be the customer's account number with the proprietor of the digital document delivery) identifies those documents intended for electronic delivery by comparing such information with information received from the customer's preference file 18 via a communication path 19, and thereby creates a separate electronic print stream 25 for such documents.

Likewise, the print stream separator generates the first print stream 24 intended for hard copy printing, which excludes those documents intended for electronic delivery.

Furthermore, the print stream separator generates an Electronic Mail Run Data File Specification (EMRDF) which contains control and preference information with respect to those electronic documents presented on output 25. The electronic inserter 26 receives both the electronic print stream data 25 and the EMRDF data output 28. The electronic inserter generates an electronic output print stream on output 34 which contains information regarding the electronic primary document to be presented to the customer. The EMRDF file containing information concerning any additional secondary documents known as "inserts" which are intended to be delivered with the primary document to that customer, are presented to the router instruction processor (RIP) 36. This technique is thus an electronic analog of the output generated by the high speed, high volume printer 22, which is also able to insert additional documents with the primary document based upon information received in the print stream 24. For hard copy, this result is performed by what is known in the art as an inserting system which inserts documents with the primary document, such as advertising inserts, accompanying a customer bill with the specific inserts based upon a customer preference file.

The customer preference file 18 may contain information concerning the customer such as the customer's sex, age, interests and the like. This information can be used by the electronic inserter to determine which of the inserts are of potentially the greatest interest to that customer and thus gives higher priorities to those inserts.

The electronic analog does not necessarily need to generate the electronic equivalent of such secondary documents (inserts) but rather need only contain links which can be used by the customer with an associated computer executing an Internet browser for using those links to access the specific insert information and viewing same on the customer's browser.

The electronic inserter also receives general customer information from the customer preference file 18 stored in the customer preference database 20 via communication path 30. This information, for instance, can include the customer's e-mail address, facsimile number, beeper number, resident address and the like. It can also include the customer's preference for bill notification; such as e-mail as the first preference, and fax message as the second preference. Some of this information can be used to determine how the customer is to be notified (e.g., E-mail, fax, beeper, regular mail) that a primary document is ready for viewing. If the customer does not view the primary document within a predetermined length of time, an alternative method of notification can be used.

Furthermore, the electronic inserter receives information from a job set up application module 32 via communication path 33 which contains information concerning potential inserts and their associated links which may form part of the print stream 34 for a specific customer, based upon that customer's preferences.

In this regard, reference is made to the details of the Electronic Mail Run Data File and how it is used by the electronic inserter to select inserts to accompany the primary document for a particular customer. The EMRDF is a file that is analogous to the MRDF file structure used with physical print inserters. The EMRDF is intended to contain information that is known only to the mechanism that generates the print stream. Other files in the system have information about the customer, such as the customer database file 20, as well as specifics concerning the particular print job as contained in the job set up application module 32.

The EMRDF contains piece-level information for each document in the electronic print system. Its primary purpose is therefore to indicate which electronic insert(s) (secondary documents{s}) is to accompany the primary document, as well as the priority of that insert vis-a-vis other inserts. This information is translated into the equivalent of an electronic insert such as a hypertext markup language (HTML) page or bit maps, or files in the PDF format, etc., as well as the relative importance for positioning the link to the insert with respect to the primary document.

Priorities with regard to physical print inserts are normally based upon overall weight of the envelope and its contents and, from that, the inserts typically have priority, such as "must have", which means that it is to be inserted if the weight of the overall envelope is under a predetermined amount, such as one ounce.

For electronic presentation, priorities can be of a different nature, for instance, where on the primary document the link to the insert should be displayed to the customer and the like. Thus, customers might want high priority inserts in a more visible location on the primary document than lower-priority inserts. Higher priority inserts may also contain JAVA language applets for making the insert more visible or pleasing to the customer. In general, priority data when used for electronic presentation is used by the electronic insert decision-making algorithms for purposes of determining the location and number of inserts to be presented to the customer. The determination of an insert's priority can be fixed (i.e., the same for all customers) or it can be based upon information of the specific customer (i.e., the customer's age, sex, occupation, income level and the like). The customer preference can form part of the customer preference data 18 transferred to the print stream separator 16.

The customer preference data can also be used to determine the inclusion or exclusion of a particular secondary document. As seen in Table 3, parameter "Insertxx" (where "xx" is a number from 1 to 16) is a Boolean parameter which indicates the inclusion or exclusion of a particular insert. The customer preference file can, therefore, be used to set the true or false state of any of these parameters, which, in the example shown, has information for sixteen inserts (Insert01 through Insert16).

The EMRDF file contains fields which are all of the type "character". The character set can vary depending upon where the EMRDF file is used and, thus, can be in the EBCDIC format when used for mainframe computer output and can be in the ASCII output when used on computer servers using the Microsoft NT operating system or the UNIX operating system. Of course, if the EMRDF file is in the ASCII format and it is to be transferred to a mainframe, it would generally have to first be converted to the EBCDIC format.

The fields of the EBRDF file are typically left justified and padded with blanks for the remainder of each field. The file consists of a header record with N piece records, where N is an integer up to some maximum number of primary documents for a given print job, such as ten million. Each of these record types is defined in Table 2. The records are terminated by two bytes containing carriage return (CR) and line feed (LF) characters (ASCII hex 0D 0A).

As set forth in Table 2, the specifics of the record are shown with regard to the header while Table 3 shows the specifics of the piece records. From these tables, it is clear that the inserts can have a priority based upon the number of inserts. In the preferred embodiment, the priority can be from 1 to 16 for each primary document.

As seen in Tables 2 and 3, the header record thus contains exactly 40 bytes and the piece record contains exactly 124 bytes. In the preferred embodiment of the invention, there can be up to ten million piece records in a given file.

As also seen in FIGS. 1A and 1B, the customer preference database is typically associated with an enrollment application module 27 which interacts with the user, typically over the Internet so as to update the customer preference data associated with a given customer. Such information can include address information, interests of the customer, as well as any other pertinent information deemed necessary or desirable for the proprietor of the digital document delivery system.

In operation, the print stream separator, based upon customer preference data received from the customer preference database, determines which print documents should be separated from the overall print stream for presentation to the electronic inserter. Furthermore, based upon the customer preference data, the details of the Electronic Mail Run Data File can be determined for presentation to the electronic inserter.

Other data concerning the customer via the customer preference database can be communicated from this database via communication path 19 to the electronic inserter, such as the customer's e-mail address, preferences concerning document notification, and the like. Furthermore, as seen in FIGS. 1A and 1B, not only does the electronic inserter generate an output print stream file, typically in an AFP format, but it also can generate control and status data via communication path 37 to a control and reporting module 39 with control and status data typically being generated by the electronic inserter for presentation to the controller reporting module. Such information can then be used to determine the status of a given print run, as well as the nature of the customers and inserts associated with the primary documents sent to the customers in that particular print run.

The overall system thus comprises an efficient and convenient method for extracting documents for electronic delivery to customers from a print stream which contains print data, with the determination for extraction based upon a customer preference database. Furthermore, the invention provides for the ability of generating links to other documents for presentation to the customer in electronic form based upon the preferences of the particular customer who is receiving the electronic primary document.

MODULE DETAILS

Figure 2:
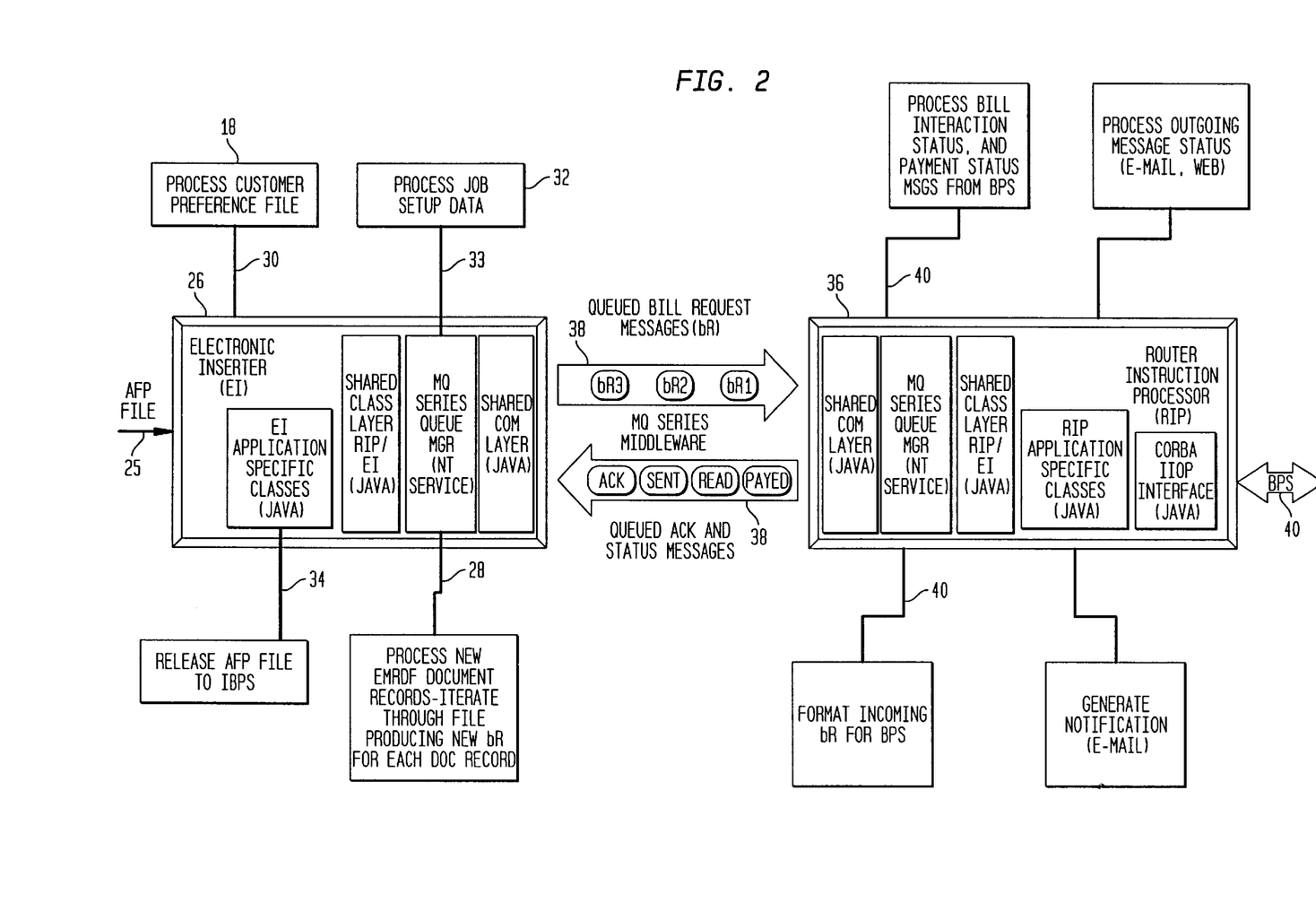
FIG. 2 is a block/flow diagram of the electronic inserter and router instruction processor shown in FIGS. 1A and 1B.
Figure 3:
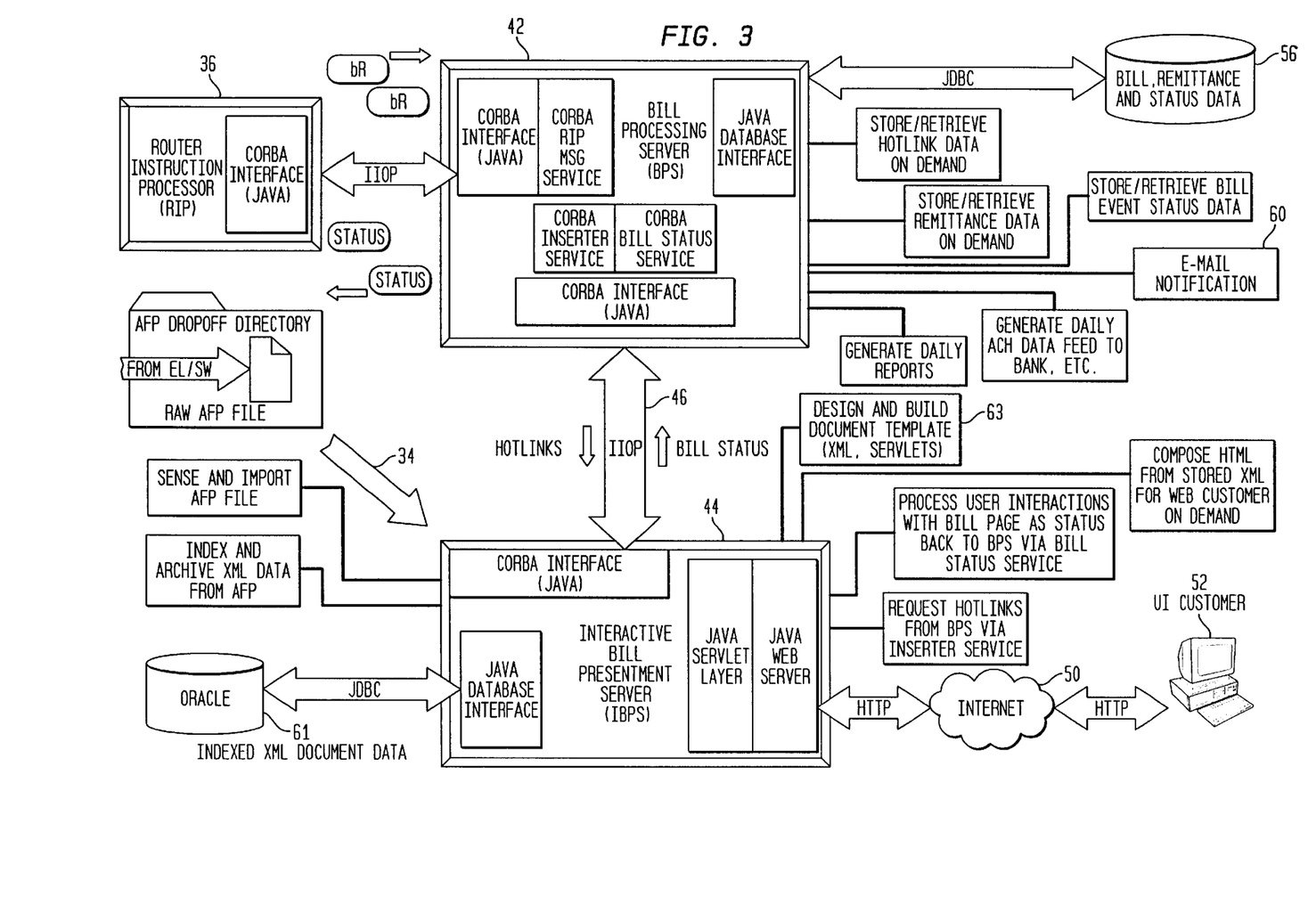
FIG. 3 is a block/flow diagram of the router instruction processor, bill processing server and interactive bill presentment server shown in FIGS. 1A and 1B.

Details of the modules described above so as to achieve the stated operation are presented in Table 4. FIG. 2 shows details of the modules as well as the objects and language protocols used in the preferred embodiment of the present invention.

The print stream separator, electronic inserter, BPS and IBPS can be implemented on computer servers; e.g., Intel processor based servers using Microsoft Windows NT™ on UNIX™ operating systems. A high level object oriented language, e.g., Sun Microsystems' JAVA language, can be preferably used to implement the specific instructions for performing above described tasks.

In the foregoing specification, the invention has been described as referenced to specific embodiments thereof. It will, however, be evident that various modification and changes may be made thereto without departing from the broader spirit and scope of the invention. The specification and drawings are, accordingly, to be regarded as illustrative rather than in a restrictive sense.

TABLE 1

| ACRONYMS | DEFINITIONS |
| --- | --- |
| ACH | Automated Clearing House |
| AFP | Advanced Format for Printing |
| ASCII | American Standard Code for Information Exchange |
| CORBA | Common Object Request Broker Architecture |
| EBCDIC | Extended Binary Coded Decimal Interchange Code |
| HTML | Hypertext Markup Language |
| HTTP | Hypertext Transport Protocol |
| IIOP | Internet Inter-ORB Protocol |
| JDBC | JAVA Database Connectivity |
| MRDF | Mail Run Data File |
| ORB | Object Request Broker |
| PDF | Portable Document Format |
| SMTP | Simple Mail Transfer Protocol |
| XML | Extended Markup Language |

TABLE 2

| Parameter | Length | Offset | Description |
| --- | --- | --- | --- |
| EMRDFID | 10 | 0 | Identifier for this job |
| PrtStrmID | 20 | 10 | Identifies which print stream, most likely a file, that goes with this EMRDF. For a file, 8-dot-3 naming convention is acceptable. The directory in which the file resides is a job setup parameter. |
| TotalPieces | 8 | 30 | Total number of piece records. 10M max. |
| RecEnd | 2 | 38 | CRLF pair; hex 0D0A |

The header record contains exactly 40 bytes.

TABLE 3

| Parameter | Length | Offset | Description |
| --- | --- | --- | --- |
| PieceNumber | 8 | 40 | Piece number, Unique to file. |
| AccountNumber | 20 | 48 | Customer's account number for billing. |
| PaperFlag | 1 | 68 | Y or N indicating whether paper was sent also. |
| TemplateID | 5 | 69 | Template for document composition. |
| Insert01 | 1 | 74 | Y or N indicating whether to include this insert. |
| Insert02 | 1 | 75 | Y or N indicating whether to include this insert. |
| Insert03 | 1 | 76 | Y or N indicating whether to include this insert. |
| Insert04 | 1 | 77 | Y or N indicating whether to include this insert. |
| Insert05 | 1 | 78 | Y or N indicating whether to include this insert. |
| Insert06 | 1 | 79 | Y or N indicating whether to include this insert. |
| Insert07 | 1 | 80 | Y or N indicating whether to include this insert. |

TABLE 3-continued

| Parameter | Length | Offset | Description |
|---|---|---|---|
| Insert08 | 1 | 81 | Y or N indicating whether to include this insert. |
| Insert09 | 1 | 82 | Y or N indicating whether to include this insert. |
| Insert10 | 1 | 83 | Y or N indicating whether to include this insert. |
| Insert11 | 1 | 84 | Y or N indicating whether to include this insert. |
| Insert12 | 1 | 85 | Y or N indicating whether to include this insert. |
| Insert13 | 1 | 86 | Y or N indicating whether to include this insert. |
| Insert14 | 1 | 87 | Y or N indicating whether to include this insert. |
| Insert15 | 1 | 88 | Y or N indicating whether to include this insert. |
| Insert16 | 1 | 89 | Y or N indicating whether to include this insert. |
| InsertPriority01 | 2 | 90 | Priority of this insert. 1 to 16 |
| InsertPriority02 | 2 | 92 | Priority of this insert. 1 to 16 |
| InsertPriority03 | 2 | 94 | Priority of this insert. 1 to 16 |
| InsertPriority04 | 2 | 96 | Priority of this insert. 1 to 16 |
| InsertPriority05 | 2 | 98 | Priority of this insert. 1 to 16 |
| InsertPriority06 | 2 | 100 | Priority of this insert. 1 to 16 |
| InsertPriority07 | 2 | 102 | Priority of this insert. 1 to 16 |
| InsertPriority08 | 2 | 104 | Priority of this insert. 1 to 16 |
| InsertPriority09 | 2 | 106 | Priority of this insert. 1 to 16 |
| InsertPriority10 | 2 | 108 | Priority of this insert. 1 to 16 |
| InsertPriority11 | 2 | 110 | Priority of this insert. 1 to 16 |
| InsertPriority12 | 2 | 112 | Priority of this insert. 1 to 16 |
| InsertPriority13 | 2 | 114 | Priority of this insert. 1 to 16 |
| InsertPriority14 | 2 | 116 | Priority of this insert. 1 to 16 |
| InsertPriority15 | 2 | 118 | Priority of this insert. 1 to 16 |
| InsertPriority16 | 2 | 1120 | Priority of this insert. 1 to 16 |
| RecEnd | 2 | 122 | CRLF pair; hex 0D0A |

The piece record contains exactly 124 bytes. There can be up to 10 million piece records in a file.

TABLE 4

| MODULE | FUNCTION |
|---|---|
| Enrollment Application Module 27 | Capture customer account number, full name of customer, email address of customer, checking account number, customer's account bank name, bank routing number, WEB password |
| Print Stream Separator 16 | Based on customer account number, split out documents destined by digital delivery, send these documents as AFP file. |
| Electronic Inserter 26 | Get data from Job Setup Module 32, customer preference file from customer preference database 20, print stream separator 16 and EMRDF output, compose bill request objects (bR), receive status messages from RIP, control AFP feed to IBPS. |
| Job Setup Application 32 | Produce file of inserts in the form of hotlinks that are logically assigned to physical inserter bins. |
| Router Instruction Processor (RIP) 36 | Service incoming requests from multiple clients (EIs), route requests to FAX, EMAIL, WEB, LOCAL PRINT, and PAGER, issue notifications based on status received, process status back to clients. |
| Database Account 56 | Store remittance data, bill data, and status data for digital bills. |
| Bill Processing Server (BPS) 42 | Save and retrieve bill data to the database, service CORBA requests for hotlinks from IBPS, process bill status messages from IBPS back to the RIP, issue reports and initiate payments feeds. |
| Interactive Bill Present Server (IBPS) 44 | Process interactive events performed on the bill by customers, render HTML to customers based on downloaded servlets and stored XML rules, design document templates. |

What is claimed is:

1. An apparatus for separating print stream data containing a plurality of primary documents and information concerning associated customers for receipt of each primary document, said print stream data to be separated into at least two data paths by said apparatus, one path of which is for electronic delivery of an electronic primary document with N secondary documents inserts, where N is a non-negative integer including 0, said apparatus comprising:

a print stream separator having:
A) means for receipt of the print stream data and means for receipt of customer preference data regarding at least some of the customers to which said print stream is directed;
B) means based upon the customer preference data for determining if a particular primary document in the print stream is intended for electronic delivery to the associated customer and if so, generate an output of the print stream for electronic delivery thereof; and
C) means for generating an output for the remaining print stream data for non-electronic delivery thereof;

an electronic inserter for receipt of the print stream for electronic delivery and for receiving the second output related to the preferences of the associated customer, for generating an electronic print stream output containing the primary document associated with the customer, as well as information with respect to each secondary document to be associated with the primary document based upon the customer preference data, the electronic inserter having:
A) means for receipt of job setup data which contains information concerning links directed to secondary documents that can be associated with a primary document for delivery to a particular customer electronically; and
B) means for generating control and status data concerning the electronic print stream output generated by the electronic inserter;

wherein the electronic inserter receives customer preference data from a customer preference database, wherein said information is used to assist in notifying customers that at least a primary document is available for viewing, wherein the received customer preference data by the electronic inserter can be used to determine the specific way the customer is notified that at least a primary document is available for viewing, wherein the customer may be notified in more than one way that at least a primary document is available for viewing, and wherein an alternative way of notifying the customer is used if the customer does not view at least the primary document within a predetermined time after initial notification.

2. An apparatus for separating print stream data containing a plurality of primary documents and information concerning associated customers for receipt of each primary document, said print stream data to be separated into at least two data paths by said apparatus, one path of which is for electronic delivery of an electronic primary document with N secondary documents inserts, where N is a non-negative integer including 0, said apparatus comprising:

a print stream separator having:
- A) means for receipt of the print stream data and means for receipt of customer preference data regarding at least some of the customers to which said print stream is directed;
- B) means based upon the customer preference data for determining if a particular primary document in the print stream is intended for electronic delivery to the associated customer and if so, generate an output of the print stream for electronic delivery thereof; and
- C) means for generating an output for the remaining print stream data for non-electronic delivery thereof;

an electronic inserter for receipt of the print stream for electronic delivery and for receiving the second output related to the preferences of the associated customer, for generating an electronic print stream output containing the primary document associated with the customer, as well as information with respect to each secondary document to be associated with the primary document based upon the customer preference data, wherein the electronic print stream output of the electronic inserter is in the AFP file format.

3. An apparatus for separating print stream data as defined in claim 2, wherein the means for determining if a particular primary document is intended for electronic delivery further has means for generating a second output related to the control and preferences of any secondary documents to be associated with the primary document.

4. An apparatus for separating print stream data as defined in claim 3, wherein the second output of the print stream separator contains information regarding which secondary documents can accompany the primary document.

5. An apparatus for separating print stream data containing a plurality of primary documents and information concerning associated customers for receipt of each primary document, said print stream data to be separated into at least two data paths by said apparatus, one path of which is for electronic delivery of an electronic primary document with N secondary documents inserts, where N is a non-negative integer including 0, said apparatus comprising:

a print stream separator having:
- A) means for receipt of the print stream data and means for receipt of customer preference data regarding at least some of the customers to which said print stream is directed;
- B) means based upon the customer preference data for determining if a particular primary document in the print stream is intended for electronic delivery to the associated customer and if so, generate an output of the print stream for electronic delivery thereof; and
- C) means for generating an output for the remaining print stream data for non-electronic delivery thereof;

wherein the means for determining if a particular primary document is intended for electronic delivery further has means for generating a second output related to the control and preferences of any secondary documents to be associated with the primary document;

wherein the second output of the print stream separator contains information regarding which secondary documents can accompany the primary document; and wherein the second output of the print stream separator contains information regarding the priorities of the respective secondary documents that can accompany the primary document.

6. An apparatus for separating print stream data as defined in claim 5, wherein the priorities of at least one secondary document is based at least in part on customer preference data for the customer to receive said primary document.

7. An apparatus for separating print stream data as defined in claim 5, wherein the inclusion or exclusion of at least one secondary document is based upon customer preference data.

8. A method for separating print stream data containing a plurality of primary documents and information concerning associated customers for receipt of each primary document, said print stream data to be separated into at least two data paths, one path of which is for electronic delivery of an electronic primary document with N secondary documents inserts, where N is a non-negative integer including 0, said method comprising the steps of:
- A) receiving the print stream data and receiving the customer preference data regarding at least some of the customers to which said print stream is directed;
- B) based upon the customer preference data, determining if a particular primary document in the print stream is intended for electronic delivery to the associated customer and if so, generating an output of the print stream for electronic delivery thereof; and
- C) generating an output for the remaining print stream data for non-electronic delivery thereof; and,
- D) for the print stream intended for electronic delivery, prioritizing any secondary documents that are to be sent to the customer, such that some secondary documents are given higher priority for inclusion or positioning than other secondary documents.

9. A method as defined in claim 8, wherein the step of prioritizing at least one of the secondary documents is based at least in part on customer preference data for the customer to receive the primary document.

10. A method as defined in claim 8, further comprising the step of notifying the customer that at least a primary document is available for viewing.

* * * * *